S. M. VALDES.
TRAFFIC SIGNAL.
APPLICATION FILED DEC. 13, 1916.
1,237,976.
Patented Aug. 21, 1917.
2 SHEETS—SHEET 1.
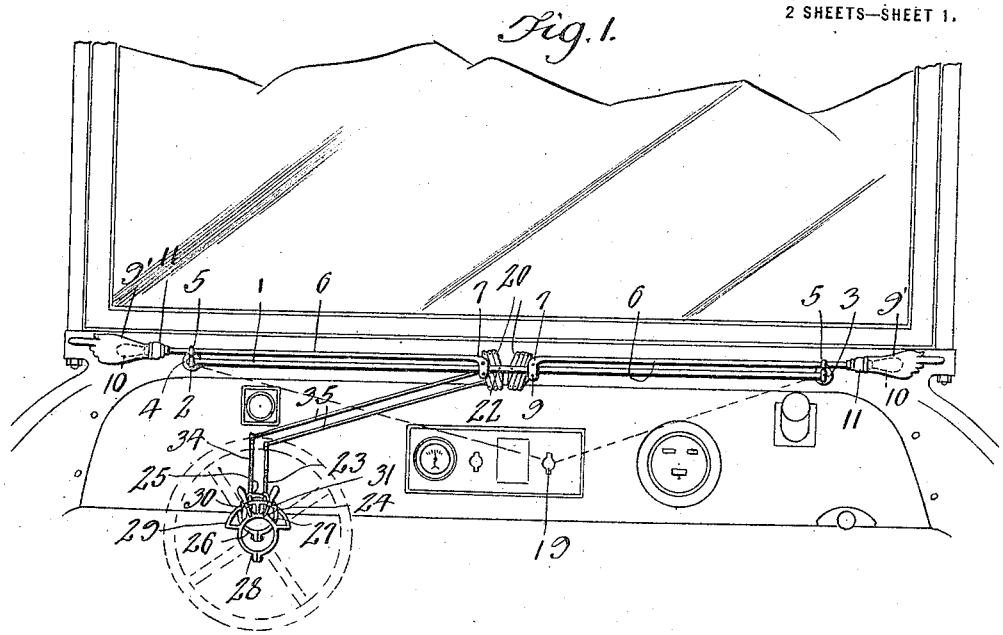
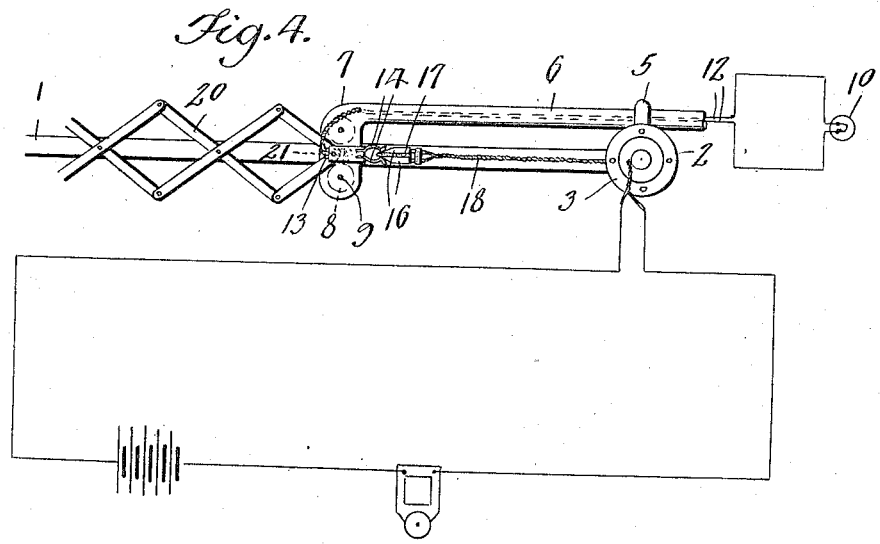
WITNESSES
INVENTOR
S. M. Valdes,
BY Victor J. Evans
ATTORNEY

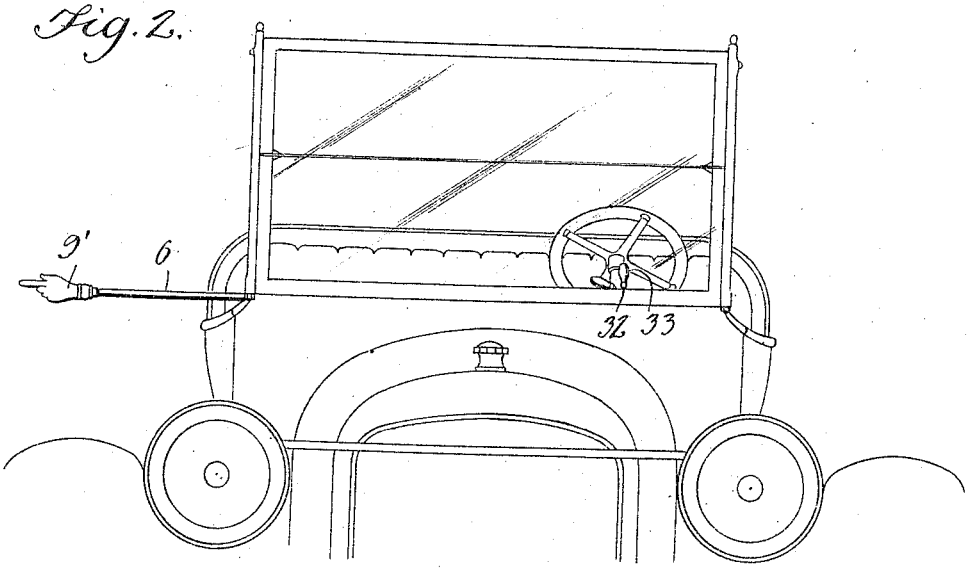
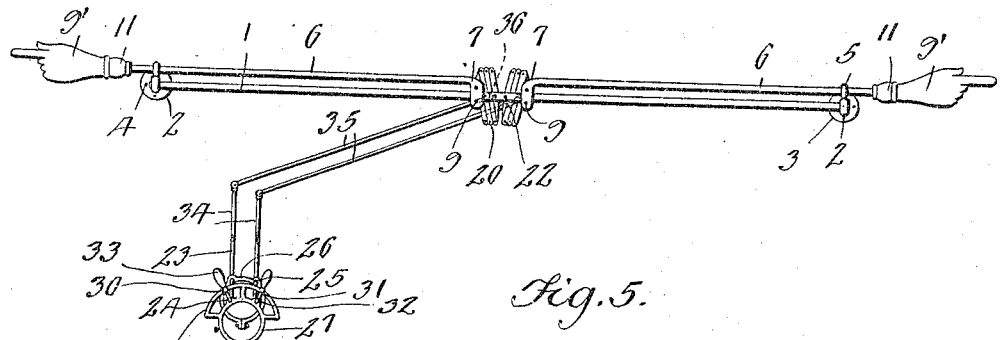
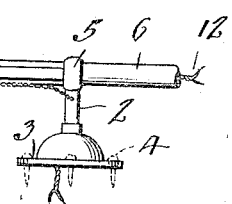

UNITED STATES PATENT OFFICE.

SALVADOR M. VALDES, OF SAN ANTONIO, TEXAS.

TRAFFIC-SIGNAL.

1,237,976.　　　　　　　Specification of Letters Patent.　　Patented Aug. 21, 1917.

Application filed December 13, 1916. Serial No. 136,743.

*To all whom it may concern:*

Be it known that I, SALVADOR M. VALDES, a citizen of the United States, residing at San Antonio, in the county of Bexar and State of Texas, have invented new and useful Improvements in Traffic-Signals, of which the following is a specification.

This invention relates to improvements in traffic signals for use on automobiles and other vehicles to indicate the contemplated course of a vehicle and thereby avoid collisions and other accidents, and to facilitate street traffic, the object of the invention being to provide an improved signaling apparatus of this kind which is simple in construction and which may be readily installed on an automobile at slight cost and by means of which the driver of the vehicle may readily signal the contemplated course of the vehicle when he is about to turn the same in either direction.

The invention consists in the construction, combination and arrangement of devices hereinafter described and claimed.

In the accompanying drawings:

Figure 1 is an elevation of a traffic signaling apparatus constructed and arranged in accordance with my invention, showing the same installed in an automobile, a portion of the latter being indicated diagrammatically.

Fig. 2 is a front elevation of the same with one of the signaling hands extended.

Fig. 3 is a detailed elevation of the same on a larger scale.

Figs. 4 and 5 are detailed views.

In the embodiment of my invention I provide a guiding and supporting bar 1 which is secured at the ends to brackets 2 by means of which said bar may be arranged and secured to the inside of the dash of the automobile at a point below the wind shield, each bracket being provided with a base plate 3 which may be secured as by means of screws 4 to the dash. Each bracket is provided with a guide ring or eye 5.

A pair of signaling arms 6 are also provided and which are preferably tubular as here shown, and each has at the inner end a downwardly extending elbow 7. Each elbow is provided with rollers 8 which are mounted on axles 9 and which rollers engage the upper and lower sides of the bar 1. Each signaling arm passes slidably through one of the guide rings or eyes 5 and hence the signaling arms are mounted for longitudinal movement on the bar 1 so that the said signaling arms may be extended outwardly beyond the sides of the automobile or drawn inwardly and entirely out of sight. Each signaling arm is provided at its outer end with a signaling device 9', here shown as a hand and said signaling devices are made of suitable transparent material. An electric lamp 10 is arranged in each signaling device and is preferably provided with a red or otherwise colored bulb. The sockets 11 for the lamps are secured to the outer ends of the signaling arms. Electric conducting wires 12 are provided for the electric lamps 10 and are passed through the tubular arms 6 and connected to their inner ends as at 13 to spring contact members 14 which are carried by said signaling arms. Fixed wedge-shaped contact members 16 are secured as at 17 on the bar 1 and are connected by conducting wires 18 with an electric lamp 19 in the dash and also with a suitable battery or other source of electricity. Said conducting wires 18 lead through the bases 3 of the brackets 2 as shown.

It will be understood that when the signaling arms are drawn inwardly the electric circuit is broken. When either signaling arm is moved outwardly to indicate the contemplated course of the vehicle, as when turning a corner or the like, such outward movement of the signaling arm causes its spring contact members 14 to engage the fixed contact members 16 and thereby complete an electric circuit through the conductors 12, 18 and the lamp 10 of said extended signaling arm so that said lamp will be supplied with current and will serve to illuminate the hand 9 in which it is placed and thus clearly signal the contemplated course of the vehicle. An electric horn or other annunciating device may also be included in the electric circuit for operation when either of the signaling devices is extended, as will be understood.

To operate the signaling arms I provide a lazytongs 20 for each of them, each lazytongs being connected at its outer end to the inner end of one of the signaling arms as at 21 and being connected at a fixed point 22 at its inner end to the bar 1. Means are provided for operating the lazytongs to cause them to project or withdraw the signaling arms as desired. For this purpose, I here show rock shafts 23 mounted in bearings 24, 25 on open rings 26, 27 respectively which are clamped around the steering post and secured as at 28. The ring 27 has a segment 29 provided with pairs of notches 30, 31 at opposite sides. Each rock shaft has a spring arm 32 at its inner end provided with a handle 33 and may be engaged with either of the notches 30, 31 to lock the rock shaft. Each rock shaft has a short rock arm 34 at its outer end to which a rod 35 is pivotally connected, each rod being pivotally connected as at 36 to one of the lazytongs' links. By turning either of the rock shafts by means of its handle 33 the lazytongs connected to said shaft may be caused to project or withdraw the signaling arm associated therewith, as will be understood. Hence the driver of the automobile may readily signal the course he intends to take and thus avoid accidents.

While I have herein shown and described a preferred form of my invention I would have it understood that changes may be made in the form, proportion and construction of the several parts, without departing from the spirit of my invention and within the scope of the appended claims.

Having thus described my invention, what I claim is:

1. In a traffic signal for automobiles, the combination with brackets adapted to be attached to the inside of the dash and having eyes at their free ends, a supporting bar mounted at its extremities in said brackets, and a pair of signal arms whereof each has a signal at its outer end, its body slidably mounted through one of said eyes, and its inner end turned down into an elbow carrying anti-friction rollers traveling above and beneath said bar; of lazytongs connected at their inner ends with said bar and at their outer ends with the respective elbows, and manually operable mechanism for selectively distending the lazytongs to project either signal beyond the side of the dash.

2. In a traffic signal for automobiles, the combination with brackets adapted to be attached to the inside of the dash and having eyes at their free ends, a supporting bar mounted at its extremities in said brackets, and a pair of signal arms whereof each has a signal at its outer end, its body slidably mounted through one of said eyes, and having its inner end turned down in an elbow slidably mounted on said bar; of lazytongs connected at their inner ends with said bar and at their outer ends with the respective elbows, each actuating a rock shaft and arm, and rods individually connecting said arms and lazytongs, for the purpose set forth.

In testimony whereof I affix my signature.

SALVADOR M. VALDES.

Copies of this patent may be obtained for five cents each, by addressing the "Commissioner of Patents, Washington, D. C."